(12) United States Patent
Yuan et al.

(10) Patent No.: US 11,281,722 B2
(45) Date of Patent: Mar. 22, 2022

(54) COGNITIVELY GENERATING PARAMETER SETTINGS FOR A GRAPH DATABASE

(71) Applicant: INTERNATIONAL BUSINESS MACHINES CORPORATION, Armonk, NY (US)

(72) Inventors: Zhong Fang Yuan, Xian (CN); Yi Ming Wang, Xi'an (CN); Kun Yan Yin, Ningbo (CN); Xue Ying Zhang, Beijing (CN); Tong Liu, Xian (CN); He Li, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 277 days.

(21) Appl. No.: 16/734,488

(22) Filed: Jan. 6, 2020

(65) Prior Publication Data

US 2021/0209161 A1    Jul. 8, 2021

(51) Int. Cl.
   *G06F 16/901*   (2019.01)
   *G06F 17/16*    (2006.01)
   *G06N 3/04*     (2006.01)

(52) U.S. Cl.
   CPC ...... *G06F 16/9024* (2019.01); *G06F 16/9027* (2019.01); *G06F 17/16* (2013.01); *G06N 3/04* (2013.01)

(58) Field of Classification Search
   None
   See application file for complete search history.

(56) References Cited

U.S. PATENT DOCUMENTS 7,239,926 B2   7/2007  Goetz
8,777,628 B2   7/2014  Jastrzembski
(Continued)

FOREIGN PATENT DOCUMENTS

| CN | 1533552 | 9/2004 | |
|---|---|---|---|
| WO | WO-2020159052 A1 * | 8/2020 | ............. G06N 3/063 |
| WO | WO-2021025075 A1 * | 2/2021 | ............... G06N 3/04 |

OTHER PUBLICATIONS

Li, Yan, et al. "CAPES: unsupervised storage performance tuning using neural network-based deep reinforcement learning." Proceedings of the international conference for high performance computing, networking, storage and analysis. 2017. pp. 1-14. (Year: 2017).*

(Continued)

*Primary Examiner* — Tony Mahmoudi
*Assistant Examiner* — Umar Mian
(74) *Attorney, Agent, or Firm* — Schmeiser, Olsen & Watts; Michael A. Petrocelli

(57) ABSTRACT

An approach is provided for generating graph database parameter settings. Parameter settings for importing data into a graph database are determined. A speed of importing simulated data into the graph database and a system resource usage are determined by executing an importing of the simulated data using the parameter settings and a simulated hardware environment. A reward associated with the parameter settings is determined. Using a policy network that includes convolutional neural networks and based on the reward and the settings, candidates of adjusted parameter settings are determined. Using a Monte Carlo tree search in multiple iterations to estimate changes in speeds of importing the simulated data and changes in system resource usages for candidates of the adjusted parameter settings, rewards for the candidates are determined. Based on the rewards, a candidate is selected as including final parameter settings that optimize an importing speed and system resource usage.

20 Claims, 7 Drawing Sheets

(56) References Cited

U.S. PATENT DOCUMENTS

| | | | |
|---|---|---|---|
| 9,082,083 B2 | 7/2015 | Virkar | |
| 9,367,601 B2 | 6/2016 | Babu | |
| 10,133,275 B1* | 11/2018 | Kobilarov | G05D 1/0272 |
| 2018/0032864 A1* | 2/2018 | Graepel | G06N 5/003 |
| 2019/0068443 A1 | 2/2019 | Li | |
| 2021/0278825 A1* | 9/2021 | Wen | G06N 3/0445 |

OTHER PUBLICATIONS

Zhang, Fan, et al. "Performance improvement of distributed systems by autotuning of the configuration parameters." Tsinghua Science and Technology 16.4 (2011): 440-448 (Year: 2011).*

Cao, Zhen, et al. "Towards better understanding of black-box auto-tuning: A comparative analysis for storage systems." 2018 {USENIX} Annual Technical Conference ({USENIX}{ATC} 18). 2018. (pp. 893-907) (Year: 2018).*

Vaquero, Luis M., and Felix Cuadrado. "Auto-tuning distributed stream processing systems using reinforcement learning." arXiv preprint arXiv: 1809.05495 (2018) (Year: 2018).*

Shen, Yelong, et al. "M-walk: Learning to walk over graphs using monte carlo tree search." arXiv preprint arXiv: 1802.04394 (2018) (Year: 2018).*

Lapesa, Gabriella et al.; A Large Scale Evaluation of Distribution Semantic Models: Parameters, Interactions and Model Selection; Transactions of the Association for Computational Linguistics, vol. 2; Dec. 2014; pp. 531-545.

Xu, Lin et al.; Hydra-MIP: Automated Algorithm Configuration and Selection for Mixed Integer Programming Experimental Evaluation of Algorithms for Solving Problems with Combinatorial Explosion; Jul. 17-18, 2011; 15 pages.

* cited by examiner

COGNITIVELY GENERATING PARAMETER SETTINGS FOR A GRAPH DATABASE

BACKGROUND

The present invention relates to graph database management, and more particularly to generating optimized parameter settings of a graph database.

A graph database is a database that uses graph structures for semantic queries, where the structures have nodes, edges, and properties that represent and store data. A graph provided by the graph database relates the data items in the store to a collection of nodes and edges, where the edges represent relationships between the nodes. A JanusGraph® graph database is an open source, distributed graph database. A JanusGraph® graph database cluster consists of one or more JanusGraph® instances. A configuration is needed to open a JanusGraph® instance. The configuration specifies the components that the graph database should use, controls the operational aspects of a deployment of the graph database, and provides tuning options which a human expert uses to improve the performance of the graph database cluster. Performance of importing batch data into a graph database varies as different parameters are set based on different cluster hardware conditions. JanusGraph is a registered trademark of The Linux Foundation located in San Francisco, Calif.

SUMMARY

In one embodiment, the present invention provides a method of generating parameter settings for a graph database. The method includes determining, by one or more processors, first settings for parameters for importing data into a graph database. The method further includes determining, by the one or more processors, a first speed of importing simulated data into the graph database and a first usage of system resources by executing an importing of the simulated data using the first settings for the parameters and a simulated environment of the graph database. The method further includes based on the first speed and the first usage, determining, by the one or more processors, a reward associated with the first settings. The method further includes using a policy network that includes convolutional neural networks (CNNs) and based on the reward and the first settings, generating, by the one or more processors, candidates of adjusted settings for the parameters. The method further includes using a Monte Carlo tree search (MCTS) in multiple iterations to estimate changes in speeds of importing the simulated data and changes in usages of system resources for respective candidates of the adjusted settings, determining, by the one or more processors, rewards for the respective candidates. The method further includes determining, by the one or more processors, that the iterations are completed. In response to the iterations being completed and based on the rewards for the respective candidates, selecting, by the one or more processors, a candidate from the candidates as including final settings for the parameters that optimize (i) a speed of importing the simulated data into the graph database and (ii) a usage of the system resources during the importing of the simulated data.

Other embodiments of the present invention provide a computer program product and a computer system that employ respective methods analogous to the method described above.

DETAILED DESCRIPTION

Overview

Using traditional approaches, tuning a graph database for improved performance of importing data and querying data requires experienced human developers and a significant amount of time (e.g., more than a week) to hard code the graph database parameters. In an actual customer scenario, there are often very few developers with extensive tuning experience and the time that can be assigned to tuning work is often limited. Tuning results under a particular hardware configuration are often difficult to re-use in other hardware configurations.

Embodiments of the present invention address the aforementioned unique challenges of tuning a graph database for optimal performance. In one embodiment, a parameter tuning system automatically generates a configuration guidance strategy that optimizes performance of data import and querying of the graph database under given cluster hardware conditions, where the strategy is generated in an amount of time that is significantly shorter than the known tuning approaches that use human experts, and so that the strategy can be re-used on different hardware configurations, thereby avoiding costly, time-consuming, and error-prone efforts to use expert developers to generate different sets of tuned parameter settings for the different sets of hardware configurations. In one embodiment, the parameter tuning system uses cognitive computing techniques including deep reinforcement learning and Monte Carlo search trees to automatically generate the configuration guidance strategy.

In one embodiment, the performance of data import and querying in the graph database is advantageously optimized prior to deploying the graph database, thereby avoiding costly changes made after the graph database goes live.

As used herein, "cognitive" and "cognitively" are defined as pertaining to a system or process that provides artificial intelligence (AI) capabilities that perform deep reinforcement learning. As used herein, "cognitive" and its variants are not to be construed as being or pertaining to mental processes or concepts performed in the human mind.

System for Generating Parameter Settings for a Graph Database

Figure 1:
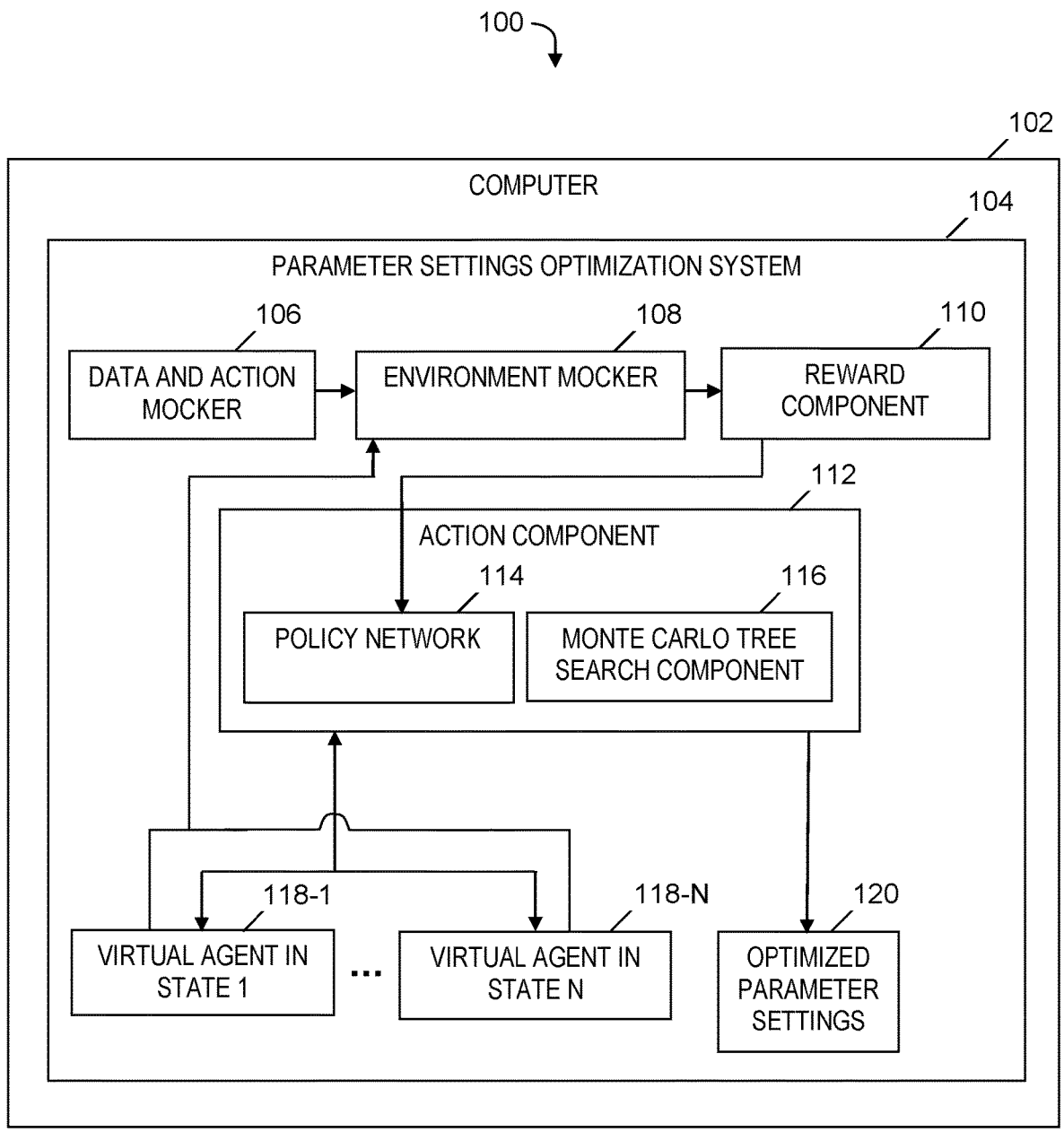
FIG. 1 is a block diagram of a system for generating parameter settings for a graph database, in accordance with embodiments of the present invention.

FIG. 1 is a block diagram of a system 100 for generating parameter settings for a graph database, in accordance with embodiments of the present invention. System 100 includes a computer 102, which executes a software-based parameter settings optimization system 104, which includes a data and action mocker 106, an environment mocker 108, and a reward component 110. Parameter settings optimization system 104 also includes an action component 112, which includes a policy network 114 and a Monte Carlo tree search (MCTS) component 116.

Parameter settings optimization system 104 also includes virtual agents 118-1, ..., 118-N, which are in respective states 1, ..., N, where N is an integer greater than one. Virtual agents 118-1, ..., 118-N automatically generate respective sets of settings for parameters of a graph database (not shown). The parameters specify a configuration of the graph database and affect a performance of importing data into the graph database and/or a performance of querying data in the graph database. Virtual agents 118-1, ..., 118-N send the parameter settings to environment mocker 108. In response to receiving feedback from reward component 110, a given virtual agent included in virtual agent 118-1, ..., 118-N generates another set of parameter settings where at least one of the parameter settings is adjusted from parameter settings in the previous state of the given virtual agent. The adjusted parameter settings may cause an improvement in the performance of the importing of data into the graph database and/or the querying of data in the graph database. In one embodiment, the improvement in the performance of the importing of the data includes an increase in the speed of importing the data and a decrease in the usage of system resources as a result of importing the data.

In one embodiment, the aforementioned parameters are configuration items (i.e., items specifying a configuration guidance strategy) and include, but are not limited to, an identifier (ID) block size, a renew timeout, read attempts, write attempts, an attempt wait, buffer size, and waiting time (also known as "wait time"). The aforementioned parameters are described below:

ID block size: indicates a size of a block of storage in which a graph element ID is reserved. An ID pool manager acquires a graph element ID in blocks for a particular graph database instance. Increasing ID block size can reduce the number of times the block is acquired, but if the value of ID block size is too large, there will be extra IDs that are unassigned and therefore wasted.

Renew timeout: indicates an amount of time (e.g., number of milliseconds) that a graph database ID pool manager will wait in total while attempting to acquire a new ID block before failing. Renew timeout may be configured as large as feasible without allowing a wait for unrecoverable failures to be too long.

Read attempts: indicates the number of times the graph database will attempt to execute a read operation against the storage backend before giving up. Read attempts may be increased if a high load on the backend during bulk loading is expected.

Write attempts: indicates the number of times the graph database will attempt to execute a write operation against the storage backend before giving up. Write attempts may be increased if a high load on the backend during bulk loading is expected.

Attempt wait: the time interval (e.g., number of milliseconds) that the graph database will wait before re-attempting a read or write operation after a read or write operation failed. A higher value of the attempt wait ensures that the re-attempts of the read or write operations do not further increase the load on the backend.

Buffer size: The graph database buffers write operations and executes the write operations in small batches to reduce the number of requests against the storage backend. The buffer size parameter controls the size of these batches. When executing many write operations in a short period of time, the storage backend can become overloaded with write requests. In that case, increasing the buffer size can avoid failure by increasing the number of write operations per request and thereby lowering the number of requests.

Waiting time: indicates the amount of time (e.g., number of milliseconds) the system waits for an ID block reservation to be acknowledged by the storage backend. As the waiting time is decreased, it is more likely that an application will fail on a congested cluster.

Data and action mocker 106 includes a script that generates a large amount of simulated data based on a schema of data to be imported into the graph database. Parameter settings optimization system 104 can trigger data and action mocker 106 to start and stop the generation of the simulated data. Data and action mocker 106 also imports (i.e., uploads) the simulated data into one or more simulated environments with a fixed speed. Data and action mocker 106 can configure the aforementioned speed with different values. Environment mocker 108 automatically simulates different environments for the graph database. In one embodiment, environment mocker 108 includes multiple scripts which clears a simulated (i.e., mocked) environment, generates a new simulated environment, and sets new parameters. The clearing of a simulated environment includes clearing old mocked environments and related parameters and is a precondition for building the next mocked environment. The generation of the new simulated environment includes using scripts to automatically set up a virtual environment with expected disks, CPUs, memory, and software. The setting of new parameters includes using scripts to set values to the parameters (i.e., provide parameter settings) related to the simulated environment.

Reward component 110 evaluates results of data and action mocker 106 simulating the importing of data into the simulated environment generated by environment mocker 108. In one embodiment, reward component 110 generates a reward (i.e., a score) that evaluates the performance results of the importing of the data into the graph database. In one embodiment, if the performance results are included in a first predetermined range of results that indicate good or satisfactory results, then reward component 110 generates a reward which is a positive numerical value, and if the performance results are included in a second predetermined range or results that indicate bad or unsatisfactory results, then reward component 110 generates a reward which is a negative numerical value. Action component 112 employs CNNs to provide deep reinforcement learning and uses the reward to generate an adjusted set of parameter settings which are included in a next state of the virtual agent. The results of the importing of the data includes the speed of the importing of the data and the usage of system resources required by the importing of the data. In one embodiment, action component 112 generates adjusted sets of parameter settings in iterations, where an amount of an adjustment of a parameter setting in a given iteration is a predetermined amount.

In one embodiment, reward component 110 generates a reward value that is divided into a long-term reward and a short-term reward. The short-term reward indicates a change in the speed at which data is imported into the graph database between two states of a virtual agent (i.e., an increase or decrease in the speed of importing the data between using a first set of parameter settings in the virtual agent in a first state and using a second set of parameter settings in the virtual agent in a second state). The long-term reward combines the short-term reward with an indication of a change in system resource usage (i.e., environmental performance consumption) between the two states of the virtual agent.

In one embodiment, the long-term reward includes a speed reward and a resource reward, where the speed reward is the increase in the speed of importing data divided by the theoretical maximum speed of importing the data, and the resource reward is the usage of system resources (i.e., occupied system resources) required by the importing of the data divided by the theoretical maximum system resource usage required by the importing of the data.

In one embodiment, reward component 110 evaluates a function of the resource reward for m system resources as expressed in equation (1) presented below.

$$f(\text{resource reward}) = (\Sigma_{n=1}^{m} \log(c_n/S_n))/m \quad (1)$$

In equation (1), $c_n$ is a measure of usage of the n-th system resource and $S_n$ is the theoretical maximum usage of the n-th system resource. In one embodiment, policy network 114 receives the value of m as a parameter. In another embodiment, policy network 114 randomly assigns the value of m.

In one embodiment, reward component 110 generates:

(i) a small positive reward in response to the speed reward indicating an increase in import speed and the resource reward indicating an increase in system resource usage;

(ii) a large negative reward in response to the speed reward indicating a decrease in import speed and the resource reward indicating an increase in system resource usage;

(iii) a large positive reward in response to the speed reward indicating an increase in import speed and the resource reward indicating a decrease in system resource usage; and (iv) a small negative reward in response to the speed reward indicating a decrease in import speed and the resource reward indicating a decrease in system resource usage.

In one embodiment, parameter settings optimization system 104 maximizes the speed reward while minimizing the resource reward to obtain optimized parameter settings 120.

Action component 112 adjusts the settings of the parameters that were set by environment mocker 108, where the adjustment of the settings is based on the reward generated by reward component 110. Policy network 114 receives as input the reward generated by reward component 110 and current parameter settings provided by a virtual agent (e.g., virtual agent 118-1) in a current state. Policy network 114 generates as output a set of candidates of adjusted parameter settings. The adjusted setting(s) in each of the candidates in the output of policy network 114 can be associated with one or more than one of the parameters. MCTS component 116 uses a Monte Carlo tree search method to perform an n-step simulation on each of the candidates in the output of policy network 114, receives corresponding rewards at each step of the simulation, and selects optimized parameter settings 120 (i.e., a final optimal combination of parameter settings) based on the rewards. To determine each corresponding reward, the virtual agent in a current state converts the embedding parameter settings into physical parameter settings (i.e., settings in the original dimensions of the parameters) via a fully connected network (not shown).

The functionality of the components shown in FIG. 1 is described in more detail in the discussion of FIG. 2, FIG. 3, FIG. 4, FIG. 5, FIG. 6, and FIG. 7 presented below.

Process for Generating Parameter Settings for a Graph Database

Figure 2:
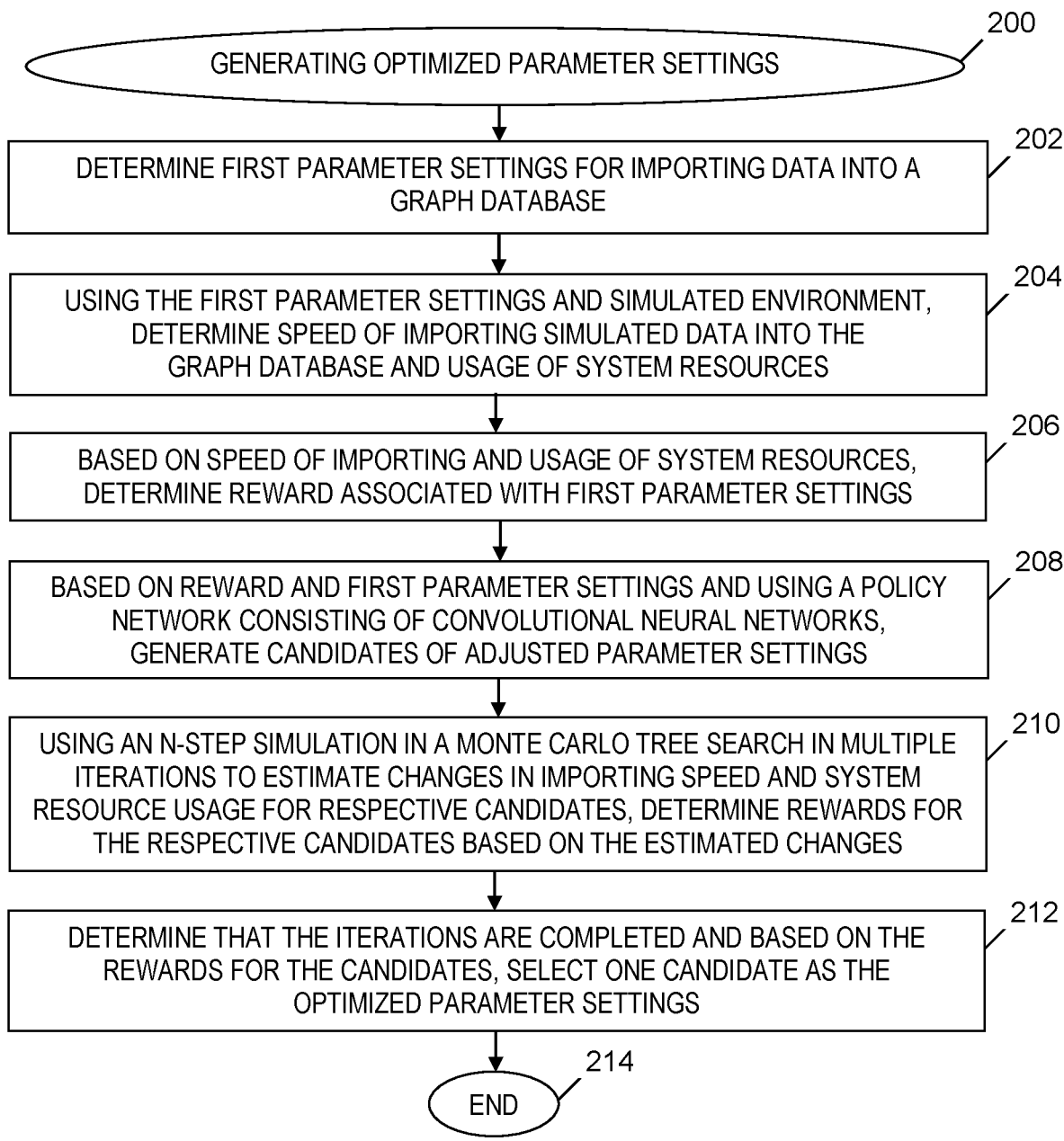
FIG. 2 is a flowchart of a process of generating parameter settings for a graph database, where the process is implemented in the system of FIG. 1, in accordance with embodiments of the present invention.

FIG. 2 is a flowchart of a process of generating parameter settings for a graph database, where the process is implemented in the system of FIG. 1, in accordance with embodiments of the present invention. The process of FIG. 2 starts at step 200. In step 202, parameter settings optimization system 104 (see FIG. 1) determines first parameter settings for importing data into a graph database.

In step 204, parameter settings optimization system 104 (see FIG. 1) determines a speed of importing simulated data generated by data and action mocker 106 (see FIG. 1) into the graph database and a measure of usage of system resources required by the importing of the simulated data. The determination of the speed of importing and the measure of the usage of system resources in step 204 uses the first parameter settings determined in step 202 and a simulated environment generated by environment mocker 108 (see FIG. 1).

In step 206, based on the speed of importing the simulated data and the measure of the usage of system resources determined in step 204, parameter settings optimization system 104 (see FIG. 1) determines a reward associated with the first parameter settings determined in step 202.

In step 208, based on the reward determined in step 206 and the first parameter settings determined in step 202 and using policy network 114 (see FIG. 1) which employs CNNs, parameter settings optimization system 104 (see FIG. 1) generates candidates of adjusted parameter settings.

In step 210, using an n-step simulation in a Monte Carlo tree search provided by MCTS component 116 (see FIG. 1) in multiple iterations to estimate changes in the speed of importing the data and changes in measures of usage of the system resources for respective candidates generated in step 208, parameter settings optimization system 104 (see FIG. 1) determines rewards for the respective candidates based on the estimated changes.

In step 212, parameter settings optimization system 104 (see FIG. 1) determines that the iterations are completed and in response to the iterations being completed and based on the rewards for the candidates, parameter settings optimization system 104 (see FIG. 1) selects one of the candidates as being optimized parameter settings 120 (see FIG. 1). In one embodiment, action component 112 (see FIG. 1) determines the multiple iterations are completed (i.e., the parameter settings in the virtual agent are in a final state) in response to determining that loss between one iteration and the next iteration is steady.

The process of FIG. 2 ends at step 214.

Figure 3:
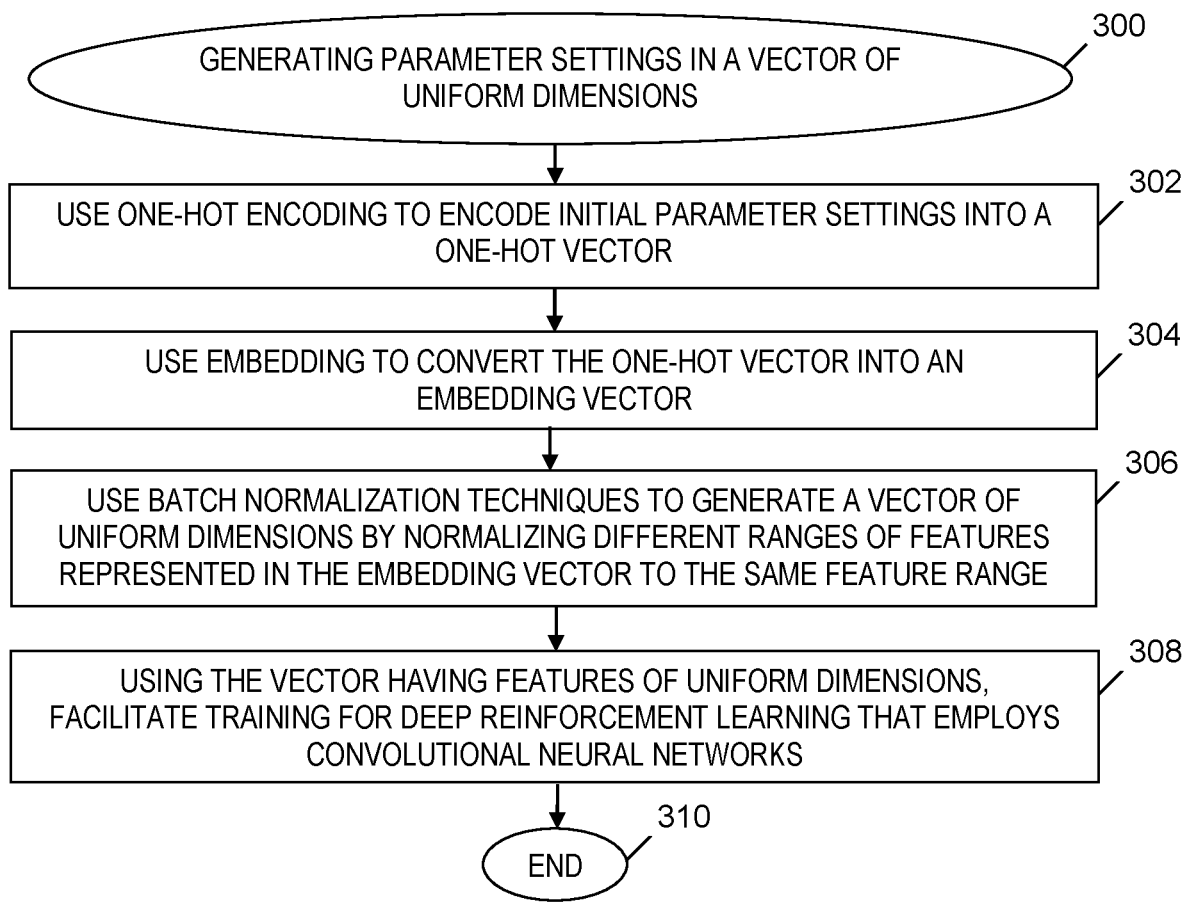
FIG. 3 is a flowchart of a process of generating parameter settings in a vector of uniform dimensions, where the generated parameters settings are used in the process of FIG. 2, in accordance with embodiments of the present invention.

FIG. 3 is a flowchart of a process of generating parameter settings in a vector of uniform dimensions, where the generated parameters settings are used in the process of FIG. 2, in accordance with embodiments of the present invention. The process of FIG. 3 begins at step 300. In step 302, parameter settings optimization system 104 (see FIG. 1) encodes initial parameter settings into a one-hot vector by using a one-hot encoding technique.

In step 304, parameter settings optimization system 104 (see FIG. 1) converts the one-hot vector encoded in step 302 into an embedding vector by using an embedding technique.

In step 306, parameter settings optimization system 104 (see FIG. 1) generates a vector of uniform dimensions by using batch normalization techniques that include normalizing different ranges of features to the same feature range, where the features are represented in the embedding vector that resulted from step 304.

In step 308, parameter settings optimization system 104 (see FIG. 1) trains deep reinforcement learning that employs the CNNs, where the training if facilitated by using the vector having features of uniform dimensions (i.e., the vector generated in step 306).

The process of FIG. 3 ends at step 310.

In one embodiment, step 202 (see FIG. 2) includes steps 302, 304, and 306 in FIG. 3. In one embodiment, a virtual agent included in virtual agent 118-1, . . . , virtual agent 118-N (see FIG. 1) consists of different parameters that need to be adjusted during the importing of data into the graph database. Since the parameters to be adjusted have different measurement units and physical meanings (i.e., meanings in the physical world), parameter settings optimization system 104 (see FIG. 1) converts the parameters into a vector representation of uniform dimensions (i.e., the vector generated in step 306) in order to facilitate training for the deep reinforcement learning provided by policy network 114 (see FIG. 1).

After converting the parameters of the virtual agent to the corresponding embedding parameters, the MCTS component 116 (see FIG. 1) and the policy network 114 (see FIG. 1) convert the embedding parameters into physical parameters (i.e., parameters whose values are in measurement units that have meanings in the physical world) through a fully connected network.

EXAMPLES

Figure 4:
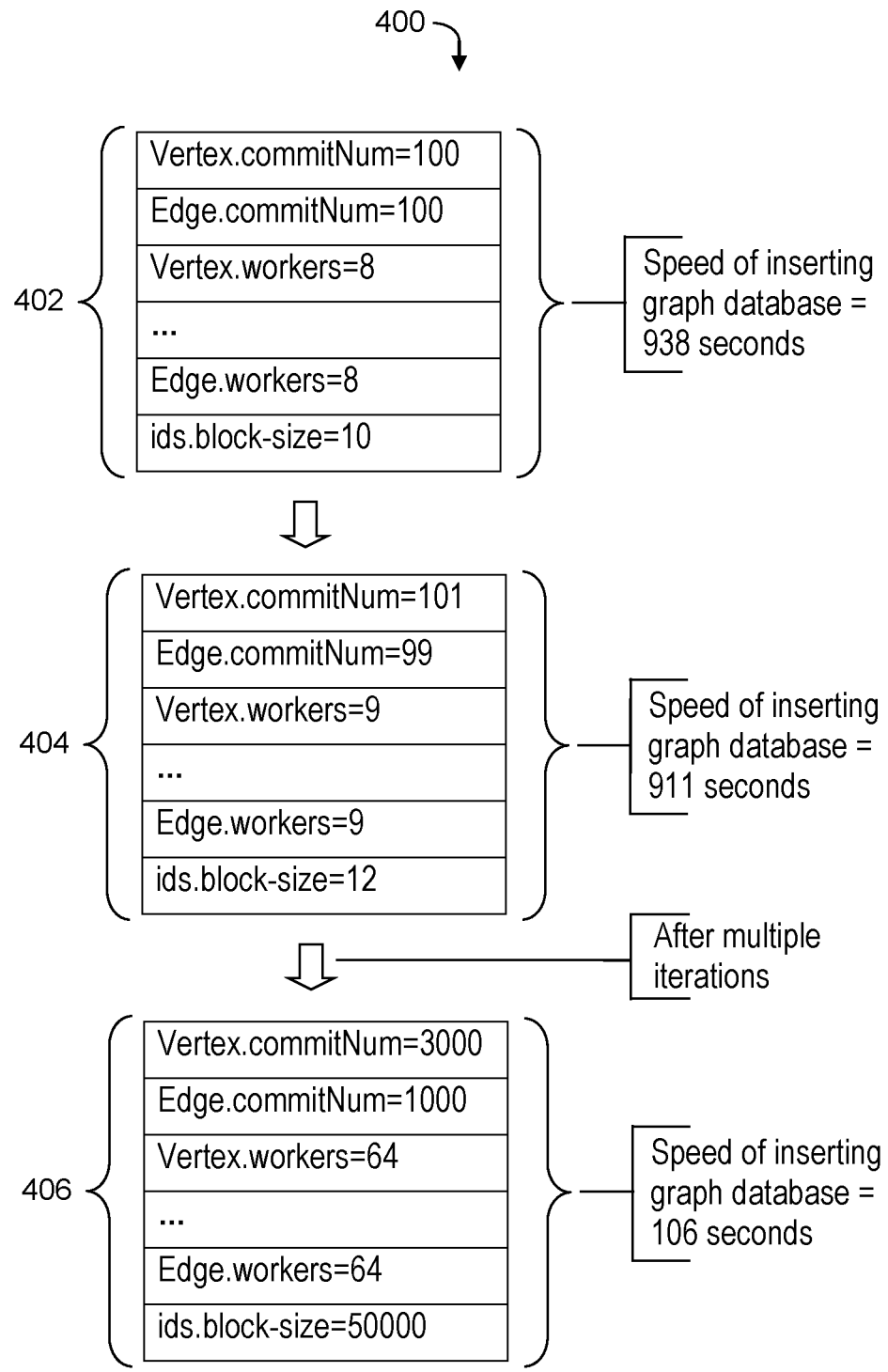
FIG. 4 is an example of initial parameter settings for a graph database and candidates of adjusted parameter settings used in the process of FIG. 2, in accordance with embodiments of the present invention.

FIG. 4 is an example 400 of initial parameter settings for a graph database and candidates of adjusted parameter settings used in step 210 in the process of FIG. 2, in accordance with embodiments of the present invention. Example 400 includes a virtual agent 402 in an initial state, which has parameters settings that include Vertex.commitNum=100, Edge.commitNum=100, etc. Parameter settings optimization system 104 (see FIG. 1) uses (i) data generated by data and action mocker 106 (see FIG. 1) and (ii) a simulated environment generated by environment mocker 108 (see FIG. 1) to determine that the speed of importing (i.e., inserting) the data into the graph database is 938 seconds when the parameter settings in virtual agent 402 are used to import the data into the graph database.

Using a reward generated by reward component 110 (see FIG. 1), action component 112 (see FIG. 1) adjusts the parameter settings in virtual agent 402 to generate a new set of parameter settings (i.e., Vertex.commitNum=101, Edge.commitNum=99, etc.) in virtual agent 404 (i.e., the virtual agent in a second state). Parameter settings optimization system 104 (see FIG. 1) uses (i) the data generated by data and action mocker 106 (see FIG. 1) and (ii) a simulated environment generated by environment mocker 108 (see FIG. 1) to determine that the speed of importing (i.e., inserting) the data into the graph database is 911 seconds when the parameter settings in virtual agent 404 are used to import the data into the graph database (i.e., an improvement in speed over the 938 seconds associated with the parameter settings in the virtual agent in the initial state).

After multiple iterations of using rewards corresponding to the virtual agent in respective states, action component 112 (see FIG. 1) adjusts the parameter settings in a next-to-last state (not shown) to generate final parameters settings (see FIG. 1) (i.e., Vertex.commitNum=3000, Edge.commitNum=1000, etc.) in virtual agent 406 (i.e., the virtual agent in the final state). Parameter settings optimization system 104 (see FIG. 1) uses (i) the data generated by data and action mocker 106 (see FIG. 1) and (ii) a simulated environment generated by environment mocker 108 (see FIG. 1) to determine that the speed of importing the data into the graph database is 106 seconds when the parameter settings in virtual agent 406 are used to import the data into the graph database (i.e., an improvement in speed over the 938 seconds associated with the parameter settings in virtual agent 402, the 911 seconds associated with the parameters settings in virtual agent 404, and other speeds (not shown) associated with other parameter settings in the virtual agent in other states (not shown)).

Figure 5:
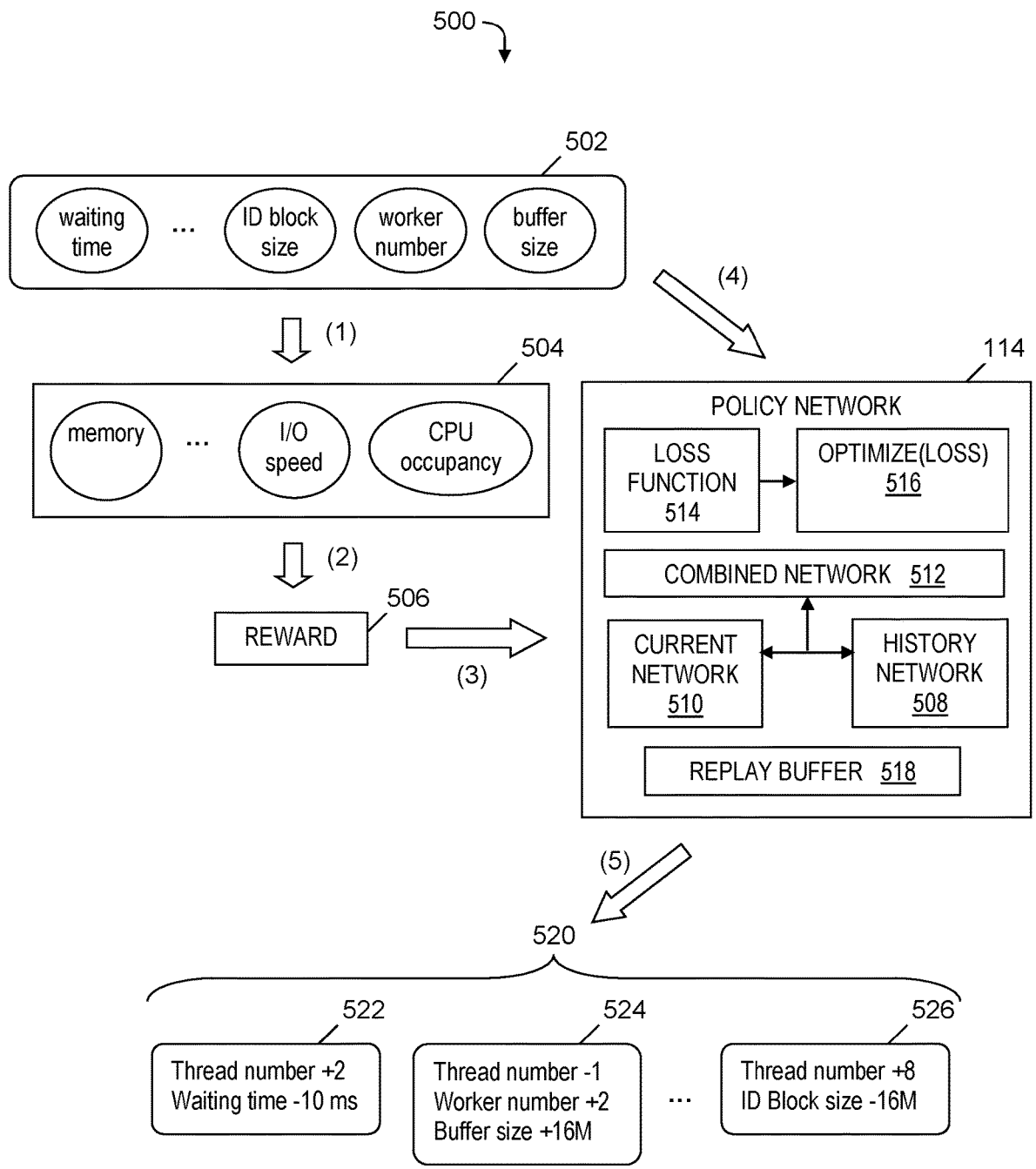
FIG. 5 is an example of a policy network generating candidates of adjusted parameter settings based on previous parameter settings and a reward in the process of FIG. 2, in accordance with embodiments of the present invention.

FIG. 5 is an example 500 of a policy network generating candidates of adjusted parameter settings based on previous parameter settings and a reward in step 208 in the process of FIG. 2, in accordance with embodiments of the present invention. In step (1), parameter settings optimization system 104 (see FIG. 1) uses parameter settings 502 in environment 504 to import data into the graph database and in step (2) generates a reward 506 that indicates the speed of the import and the usage of system resources required by the import. Policy network 114 includes a history network 508 (i.e., a history CNN) to save historical parameter settings that were processed in previous iterations by policy network 114. Policy network also includes a current network 510 (i.e., a current CNN) that is used for the training of a current action by a deep reinforcement learning technique and takes as input the reward 506 and the current parameter settings 502. Policy network 114 merges current network 510 with history network 508 to form a combined network 512. In steps (3) and (4), policy network 114 receives reward 506 and parameter settings 502, respectively. In step (5), policy network 114 inputs parameter settings 502 and reward 506, and uses a deep reinforcement learning technique that employs a loss function 514, an optimization 516 of the loss function, and a replay buffer 518 to generate candidates 520 of sets of adjusted parameter settings, which include sets 522, 524, and 526.

Figure 6:
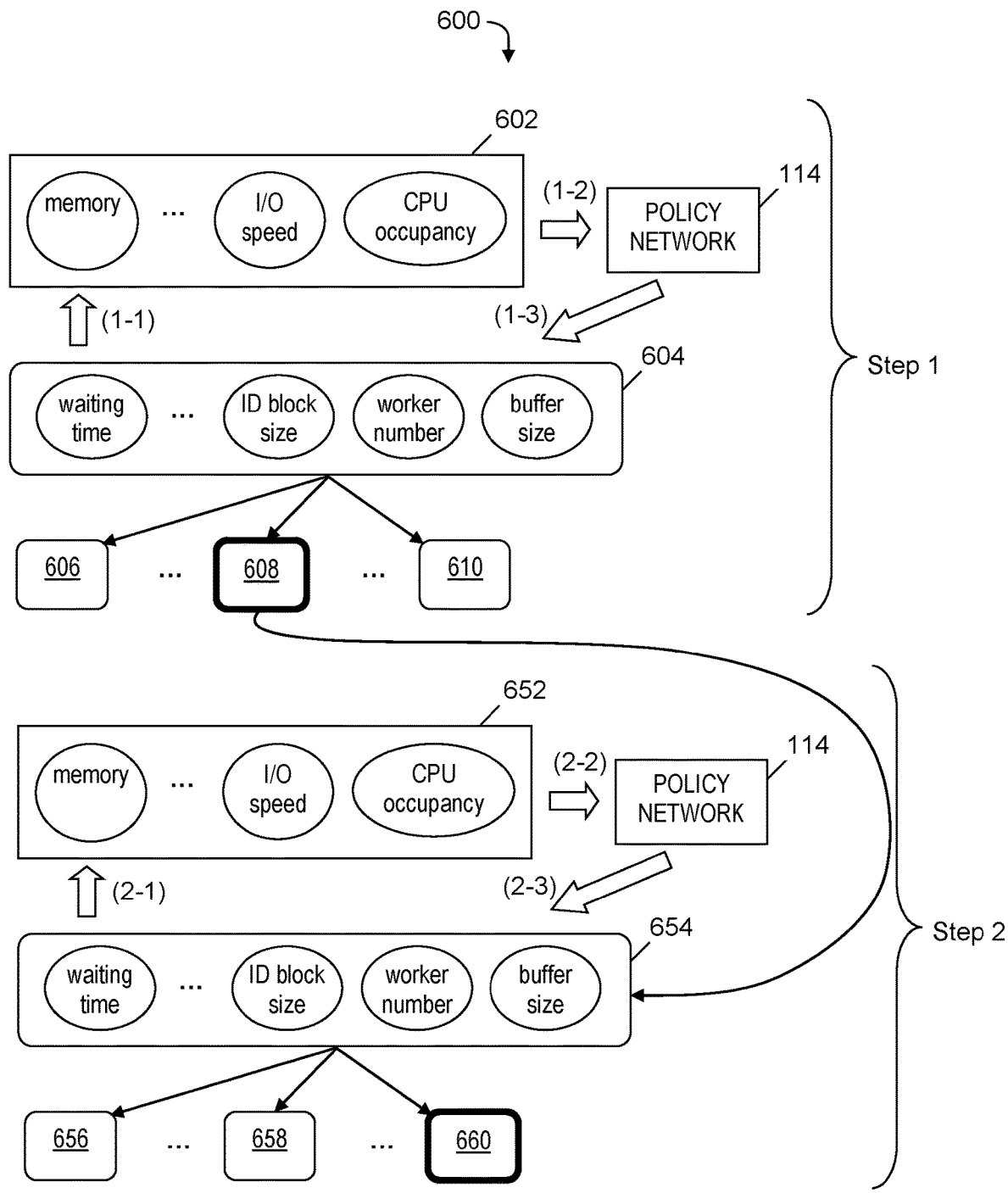
FIG. 6 is an example of a Monte Carlo tree search operating on candidate parameter settings in the process of FIG. 2, in accordance with embodiments of the present invention.

FIG. 6 is an example 600 of a Monte Carlo tree search operating on candidate parameter settings in the process of FIG. 2, in accordance with embodiments of the present invention. Example 600 illustrates a Step 1 and a Step 2 as part of an n-step simulation performed by MCTS component 116 (see FIG. 1). Step 1 has three sub-steps: 1-1, 1-2, and 1-3. Similarly, Step 2 has three sub-steps: 2-1, 2-2, and 2-3. In sub-step 1-1, an environment 602 receives parameter settings in a virtual agent 604 (i.e., the virtual agent in Step 1) and generates a reward (not shown). In sub-step 1-2, policy network 114 receives the reward and the parameter settings from virtual agent 604. In sub-step 1-3, MCTS component 116 (see FIG. 1) generates multiple candidates of parameter adjustment combinations (i.e., adjustments to parameter settings in virtual agent 604) by the Monte Carlo search tree method, where the multiple candidates include parameter adjustment combinations 606, 608, and 610. MCTS component 116 (see FIG. 1) performs an n-step simulation on each of the candidates of parameter adjustment combinations to estimate the speed of importing the data into the graph database and the associated system resource usage.

Step 2 is a subsequent step in the n-step simulation that indicates further processing of the parameter settings in parameter adjustment combination 608. In sub-step 2-1, an environment 652 receives parameter settings in a virtual agent 654 (i.e., the virtual agent in Step 2, which includes the adjusted parameter settings in combination 608) and generates a reward (not shown). In sub-step 2-2, policy network 114 receives the reward and the parameter settings from virtual agent 654. In sub-step 2-3, MCTS component 116 (see FIG. 1) generates multiple candidates of parameter adjustment combinations (i.e., adjustments to parameter settings in virtual agent 654) by the Monte Carlo search tree method, where the multiple candidates include parameter adjustment combinations 656, 658, and 660.

Although not shown completely in FIG. 6, MCTS component 116 (see FIG. 1) continues performing the n-step simulation to select a final parameter adjustment combination that provides a maximized speed of importing the data and a minimized usage of system resources required by the importing of the data. The final parameter adjustment combination includes optimized parameter settings 120 (see FIG. 1).

Computer System

Figure 7:
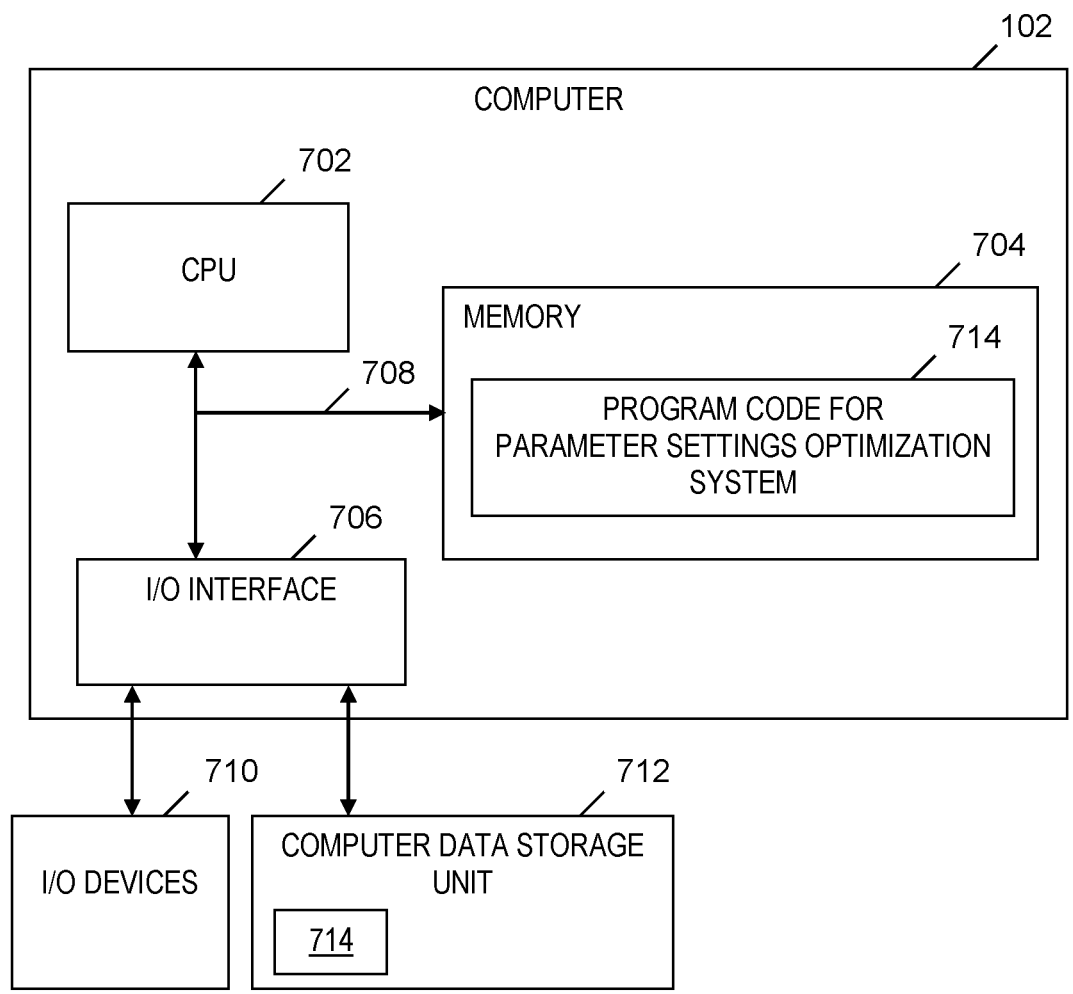
FIG. 7 is a block diagram of a computer that is included in the system of FIG. 1 and that implements the processes of FIG. 2 and FIG. 3, in accordance with embodiments of the present invention.

FIG. 7 is a block diagram of a computer that is included in the system of FIG. 1 and that implements the processes of FIG. 2 and FIG. 3, in accordance with embodiments of the present invention. Computer 102 is a computer system that generally includes a central processing unit (CPU) 702, a memory 704, an input/output (I/O) interface 706, and a bus 708. Further, computer 102 is coupled to I/O devices 710 and a computer data storage unit 712. CPU 702 performs computation and control functions of computer 102, including executing instructions included in program code 714 for a system that includes parameter settings optimization system 104 (see FIG. 1) to perform a method of generating optimized parameter settings, where the instructions are executed by CPU 702 via memory 704. CPU 702 may include a single processing unit or be distributed across one or more processing units in one or more locations (e.g., on a client and server).

Memory 704 includes a known computer readable storage medium, which is described below. In one embodiment, cache memory elements of memory 704 provide temporary storage of at least some program code (e.g., program code 714) in order to reduce the number of times code must be retrieved from bulk storage while instructions of the program code are executed. Moreover, similar to CPU 702, memory 704 may reside at a single physical location, including one or more types of data storage, or be distributed across a plurality of physical systems in various forms. Further, memory 704 can include data distributed across, for example, a local area network (LAN) or a wide area network (WAN).

I/O interface 706 includes any system for exchanging information to or from an external source. I/O devices 710 include any known type of external device, including a display, keyboard, etc. Bus 708 provides a communication link between each of the components in computer 102, and may include any type of transmission link, including electrical, optical, wireless, etc.

I/O interface 706 also allows computer 102 to store information (e.g., data or program instructions such as program code 714) on and retrieve the information from computer data storage unit 712 or another computer data storage unit (not shown). Computer data storage unit 712 includes a known computer readable storage medium, which is described below. In one embodiment, computer data storage unit 712 is a non-volatile data storage device, such as, for example, a solid-state drive (SSD), a network-attached storage (NAS) array, a storage area network (SAN) array, a magnetic disk drive (i.e., hard disk drive), or an optical disc drive (e.g., a CD-ROM drive which receives a CD-ROM disk or a DVD drive which receives a DVD disc).

Memory 704 and/or storage unit 712 may store computer program code 714 that includes instructions that are executed by CPU 702 via memory 704 to generate optimized parameter settings. Although FIG. 7 depicts memory 704 as including program code, the present invention contemplates embodiments in which memory 704 does not include all of code 714 simultaneously, but instead at one time includes only a portion of code 714.

Further, memory 704 may include an operating system (not shown) and may include other systems not shown in FIG. 7.

As will be appreciated by one skilled in the art, in a first embodiment, the present invention may be a method; in a second embodiment, the present invention may be a system; and in a third embodiment, the present invention may be a computer program product.

Any of the components of an embodiment of the present invention can be deployed, managed, serviced, etc. by a service provider that offers to deploy or integrate computing infrastructure with respect to generating optimized parameter settings. Thus, an embodiment of the present invention discloses a process for supporting computer infrastructure, where the process includes providing at least one support service for at least one of integrating, hosting, maintaining and deploying computer-readable code (e.g., program code 714) in a computer system (e.g., computer 102) including one or more processors (e.g., CPU 702), wherein the processor(s) carry out instructions contained in the code causing the computer system to generate optimized parameter settings. Another embodiment discloses a process for supporting computer infrastructure, where the process includes integrating computer-readable program code into a computer system including a processor. The step of integrating includes storing the program code in a computer-readable storage device of the computer system through use of the processor. The program code, upon being executed by the processor, implements a method of generating optimized parameter settings.

While it is understood that program code 714 for generating optimized parameter settings may be deployed by manually loading directly in client, server and proxy computers (not shown) via loading a computer-readable storage medium (e.g., computer data storage unit 712), program code 714 may also be automatically or semi-automatically deployed into computer 102 by sending program code 714 to a central server or a group of central servers. Program code 714 is then downloaded into client computers (e.g., computer 102) that will execute program code 714. Alternatively, program code 714 is sent directly to the client computer via e-mail. Program code 714 is then either detached to a directory on the client computer or loaded into a directory on the client computer by a button on the e-mail that executes a program that detaches program code 714 into a directory. Another alternative is to send program code 714 directly to a directory on the client computer hard drive. In a case in which there are proxy servers, the process selects the proxy server code, determines on which computers to place the proxy servers' code, transmits the proxy server code, and then installs the proxy server code on the proxy computer. Program code 714 is transmitted to the proxy server and then it is stored on the proxy server.

Another embodiment of the invention provides a method that performs the process steps on a subscription, advertising and/or fee basis. That is, a service provider can offer to create, maintain, support, etc. a process of generating optimized parameter settings. In this case, the service provider can create, maintain, support, etc. a computer infrastructure that performs the process steps for one or more customers. In return, the service provider can receive payment from the customer(s) under a subscription and/or fee agreement, and/or the service provider can receive payment from the sale of advertising content to one or more third parties.

The present invention may be a system, a method, and/or a computer program product at any possible technical detail level of integration. The computer program product may include a computer readable storage medium (or media) (i.e., memory 704 and computer data storage unit 712) having computer readable program instructions 714 thereon for causing a processor (e.g., CPU 702) to carry out aspects of the present invention.

The computer readable storage medium can be a tangible device that can retain and store instructions (e.g., program code 714) for use by an instruction execution device (e.g., computer 102). The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions (e.g., program code 714) described herein can be downloaded to respective computing/processing devices (e.g., computer 102) from a computer readable storage medium or to an external computer or external storage device (e.g., computer data storage unit 712) via a network (not shown), for example, the Internet, a local area network, a wide area network and/or a wireless network. The network may comprise copper transmission cables, optical transmission fibers, wireless transmission, routers, firewalls, switches, gateway computers and/or edge servers. A network adapter card (not shown) or network interface (not shown) in each computing/processing device receives computer readable program instructions from the network and forwards the computer readable program instructions for storage in a computer readable storage medium within the respective computing/processing device.

Computer readable program instructions (e.g., program code 714) for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations (e.g., FIG. 2 and FIG. 3) and/or block diagrams (e.g., FIG. 1 and FIG. 7) of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions (e.g., program code 714).

These computer readable program instructions may be provided to a processor (e.g., CPU 702) of a general purpose computer, special purpose computer, or other programmable data processing apparatus (e.g., computer 102) to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium (e.g., computer data storage unit 712) that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions (e.g., program code 714) may also be loaded onto a computer (e.g. computer 102), other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method of generating parameter settings for a graph database, the method comprising:
   determining, by one or more processors, first settings for parameters for importing data into a graph database;
   determining, by the one or more processors, a first speed of importing simulated data into the graph database and a first usage of system resources by executing an importing of the simulated data using the first settings for the parameters and a simulated hardware environment of the graph database;
   based on the first speed and the first usage, determining, by the one or more processors, a reward associated with the first settings;
   using a policy network that includes convolutional neural networks (CNNs) and based on the reward and the first settings, generating, by the one or more processors, candidates of adjusted settings for the parameters;
   using a Monte Carlo tree search (MCTS) in multiple iterations to estimate changes in speeds of importing the simulated data and changes in usages of system resources for respective candidates of the adjusted settings, determining, by the one or more processors, rewards for the respective candidates; and
   determining, by the one or more processors, that the iterations are completed and in response to the iterations being completed and based on the rewards for the respective candidates, selecting, by the one or more processors, a candidate from the candidates as including final settings for the parameters that optimize (i) a speed of importing the simulated data into the graph database and (ii) a usage of the system resources during the importing of the simulated data.

2. The method of claim 1, further comprising:
   generating, by the one or more processors, a one-hot vector by encoding initial parameter settings by using one-hot encoding;
   converting, by the one or more processors, the one-hot vector into an embedding vector by using an embedding technique that maps entries in the one-hot vector to respective real numbers; and
   using a batch normalization technique, generating, by the one or more processors, a vector of uniform dimensions by normalizing different ranges of features represented in the embedding vector to a uniform range of features, wherein the generated vector of the uniform dimensions includes the first settings for the parameters, and wherein the generated vector of the uniform dimensions improves a training for deep reinforcement learning performed by the policy network employs the CNNs.

3. The method of claim 1, further comprising:
   based on the first settings for the parameters, the reward, and historical settings for the parameters stored in a history CNN, training, by the one or more processors, the importing of the simulated data to generate the candidates of the adjusted settings for the parameters by using a current CNN;
   merging, by the one or more processors, the history CNN with the current CNN to form a combined CNN; and
   using the combined CNN, generating, by the one or more processors, other candidates of other adjusted settings for the parameters, wherein the CNNs include the history CNN, the current CNN, and the combined CNN.

4. The method of claim 1, further comprising using the MCTS, performing, by the one or more processors, an n-step simulation on each of the candidates of the adjusted settings, wherein the rewards for the candidates are based on the n-step simulation.

5. The method of claim 1, wherein the determining the rewards includes determining a given reward included in the rewards as a combination of a speed reward and a resource reward, wherein the speed reward and the resource reward are for a given set of parameters in a given candidate included in the candidates, wherein the speed reward is a ratio of an increase in a speed of importing the simulated data using the given set of parameters to a maximum speed of importing the simulated data, and wherein the resource reward is another ratio of a usage of the system resources during the importing using the given set of parameters to a maximum usage of the system resources.

6. The method of claim 5, further comprising:
   determining, by the one or more processors, that the given reward is a combination of a maximized speed reward and a minimized resource reward; and
   based on the given reward being the combination of the maximized speed reward and the minimized resource reward, determining, by the one or more processors, that the given set of parameters is the final settings for the parameters.

7. The method of claim 1, further comprising:
   generating, by the one or more processors and using an environment simulator, the simulated hardware environment to include a virtual environment of central processing units and memory; and
   generating, by the one or more processors and using a data simulator, the simulated data based on schema of data to be imported by the graph database, wherein the determining the first speed of the importing and the first usage of the system resources is based on the simulated hardware environment and the simulated data.

8. The method of claim 1, further comprising the step of:
   providing at least one support service for at least one of creating, integrating, hosting, maintaining, and deploying computer readable program code in the computer, the program code being executed by a processor of the computer to implement the determining the first settings for the parameters, the determining the first speed of the importing the simulated data, the determining the reward associated with the first settings, the generating the candidates of the adjusted settings for the parameters, determining the rewards for the respective candidates, the determining that the iterations are completed, and the selecting the candidate from the candidates as including the final settings for the parameters.

9. A computer program product for generating parameter settings for a graph database, the computer program product comprising:
one or more computer readable storage media having computer readable program code collectively stored on the one or more computer readable storage media, the computer readable program code being executed by a central processing unit (CPU) of a computer system to cause the computer system to perform a method comprising the steps of:
the computer system determining first settings for parameters for importing data into a graph database;
the computer system determining a first speed of importing simulated data into the graph database and a first usage of system resources by executing an importing of the simulated data using the first settings for the parameters and a simulated hardware environment of the graph database;
based on the first speed and the first usage, the computer system determining a reward associated with the first settings;
using a policy network that includes convolutional neural networks (CNNs) and based on the reward and the first settings, the computer system generating candidates of adjusted settings for the parameters;
using a Monte Carlo tree search (MCTS) in multiple iterations to estimate changes in speeds of importing the simulated data and changes in usages of system resources for respective candidates of the adjusted settings, the computer system determining rewards for the respective candidates; and
the computer system determining that the iterations are completed and in response to the iterations being completed and based on the rewards for the respective candidates, the computer system selecting a candidate from the candidates as including final settings for the parameters that optimize (i) a speed of importing the simulated data into the graph database and (ii) a usage of the system resources during the importing of the simulated data.

10. The computer program product of claim 9, wherein the method further comprises:
the computer system generating a one-hot vector by encoding initial parameter settings by using one-hot encoding;
the computer system converting the one-hot vector into an embedding vector by using an embedding technique that maps entries in the one-hot vector to respective real numbers; and
using a batch normalization technique, the computer system generating a vector of uniform dimensions by normalizing different ranges of features represented in the embedding vector to a uniform range of features, wherein the generated vector of the uniform dimensions includes the first settings for the parameters, and wherein the generated vector of the uniform dimensions improves a training for deep reinforcement learning performed by the policy network employs the CNNs.

11. The computer program product of claim 9, wherein the method further comprises:
based on the first settings for the parameters, the reward, and historical settings for the parameters stored in a history CNN, the computer system training the importing of the simulated data to generate the candidates of the adjusted settings for the parameters by using a current CNN;
the computer system merging the history CNN with the current CNN to form a combined CNN; and
using the combined CNN, the computer system generating other candidates of other adjusted settings for the parameters, wherein the CNNs include the history CNN, the current CNN, and the combined CNN.

12. The computer program product of claim 9, wherein the method further comprises using the MCTS, the computer system performing an n-step simulation on each of the candidates of the adjusted settings, wherein the rewards for the candidates are based on the n-step simulation.

13. The computer program product of claim 9, wherein the determining the rewards includes determining a given reward included in the rewards as a combination of a speed reward and a resource reward, wherein the speed reward and the resource reward are for a given set of parameters in a given candidate included in the candidates, wherein the speed reward is a ratio of an increase in a speed of importing the simulated data using the given set of parameters to a maximum speed of importing the simulated data, and wherein the resource reward is another ratio of a usage of the system resources during the importing using the given set of parameters to a maximum usage of the system resources.

14. The computer program product of claim 13, wherein the method further comprises:
the computer system determining that the given reward is a combination of a maximized speed reward and a minimized resource reward; and
based on the given reward being the combination of the maximized speed reward and the minimized resource reward, the computer system determining that the given set of parameters is the final settings for the parameters.

15. A computer system comprising:
a central processing unit (CPU);
a memory coupled to the CPU; and
a computer readable storage medium coupled to the CPU, the computer readable storage medium containing instructions that are executed by the CPU via the memory to implement a method comprising the steps of:
the computer system determining first settings for parameters for importing data into a graph database;
the computer system determining a first speed of importing simulated data into the graph database and a first usage of system resources by executing an importing of the simulated data using the first settings for the parameters and a simulated hardware environment of the graph database;
based on the first speed and the first usage, the computer system determining a reward associated with the first settings;
using a policy network that includes convolutional neural networks (CNNs) and based on the reward and the first settings, the computer system generating candidates of adjusted settings for the parameters;
using a Monte Carlo tree search (MCTS) in multiple iterations to estimate changes in speeds of importing the simulated data and changes in usages of system resources for respective candidates of the adjusted settings, the computer system determining rewards for the respective candidates; and
the computer system determining that the iterations are completed and in response to the iterations being completed and based on the rewards for the respective candidates, the computer system selecting a candidate from the candidates as including final settings for the parameters that optimize (i) a speed of importing the simulated data into the graph database and (ii) a usage of the system resources during the importing of the simulated data.

16. The computer system of claim 15, wherein the method further comprises:
the computer system generating a one-hot vector by encoding initial parameter settings by using one-hot encoding;
the computer system converting the one-hot vector into an embedding vector by using an embedding technique that maps entries in the one-hot vector to respective real numbers; and
using a batch normalization technique, the computer system generating a vector of uniform dimensions by normalizing different ranges of features represented in the embedding vector to a uniform range of features, wherein the generated vector of the uniform dimensions includes the first settings for the parameters, and wherein the generated vector of the uniform dimensions improves a training for deep reinforcement learning performed by the policy network employs the CNNs.

17. The computer system of claim 15, wherein the method further comprises:
based on the first settings for the parameters, the reward, and historical settings for the parameters stored in a history CNN, the computer system training the importing of the simulated data to generate the candidates of the adjusted settings for the parameters by using a current CNN;
the computer system merging the history CNN with the current CNN to form a combined CNN; and
using the combined CNN, the computer system generating other candidates of other adjusted settings for the parameters, wherein the CNNs include the history CNN, the current CNN, and the combined CNN.

18. The computer system of claim 15, wherein the method further comprises using the MCTS, the computer system performing an n-step simulation on each of the candidates of the adjusted settings, wherein the rewards for the candidates are based on the n-step simulation.

19. The computer system of claim 15, wherein the determining the rewards includes determining a given reward included in the rewards as a combination of a speed reward and a resource reward, wherein the speed reward and the resource reward are for a given set of parameters in a given candidate included in the candidates, wherein the speed reward is a ratio of an increase in a speed of importing the simulated data using the given set of parameters to a maximum speed of importing the simulated data, and wherein the resource reward is another ratio of a usage of the system resources during the importing using the given set of parameters to a maximum usage of the system resources.

20. The computer system of claim 19, wherein the method further comprises:
the computer system determining that the given reward is a combination of a maximized speed reward and a minimized resource reward; and
based on the given reward being the combination of the maximized speed reward and the minimized resource reward, the computer system determining that the given set of parameters is the final settings for the parameters.

* * * * *